July 11, 1950     R. S. REED     2,514,972
HAND TRUCK
Filed Oct. 6, 1947
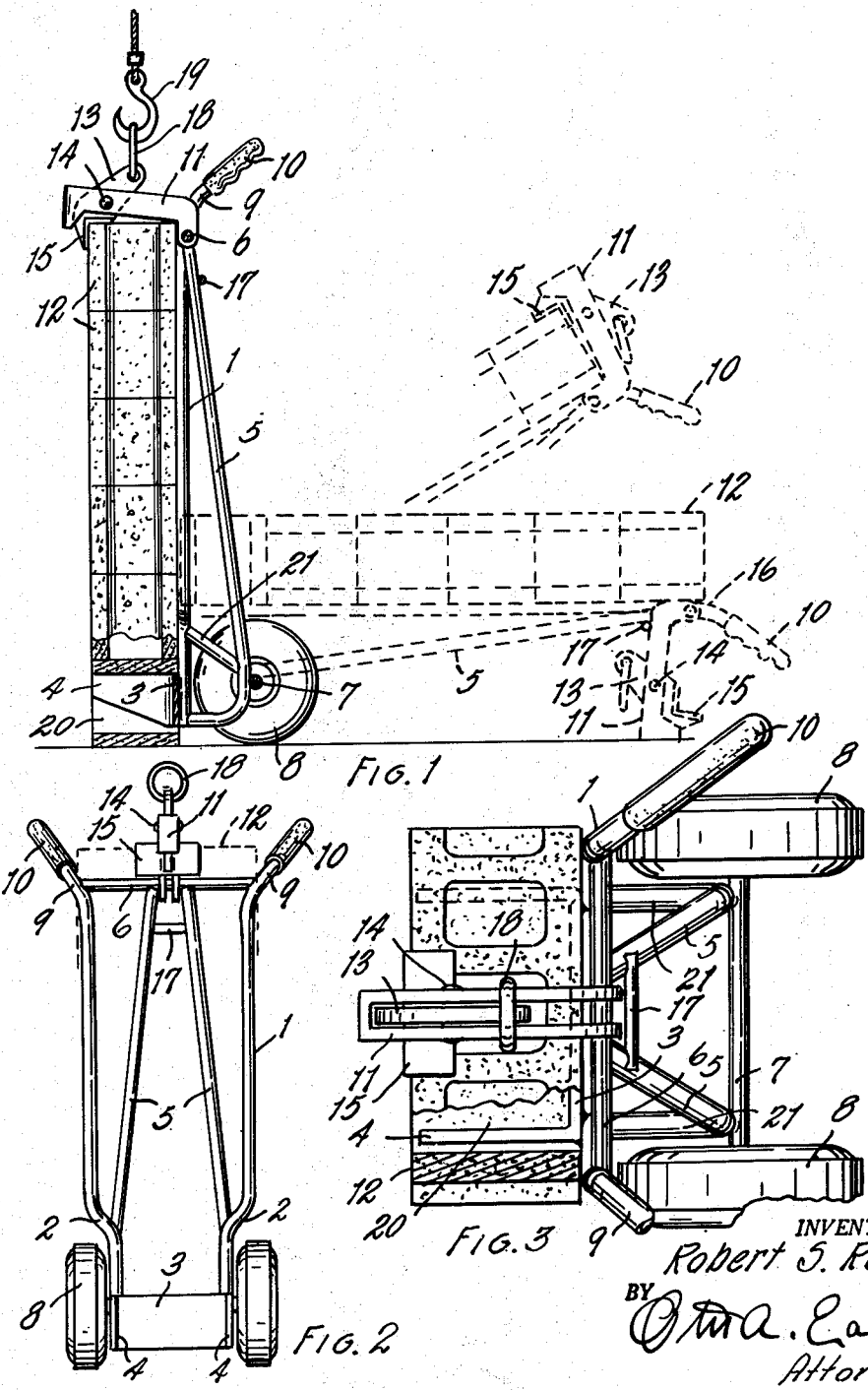
INVENTOR.
Robert S. Reed
BY *O. A. Earl*
Attorney.

Patented July 11, 1950

2,514,972

UNITED STATES PATENT OFFICE 2,514,972

HAND TRUCK

Robert S. Reed, Three Rivers, Mich.

Application October 6, 1947, Serial No. 778,135

13 Claims. (Cl. 214—65.4)

This invention relates to improvements in hand truck.

The principal objects of this invention are:

First, to provide a hand truck for holding and transporting concrete blocks and the like which is adapted to be hoisted with a load of blocks thereon to eliminate a loading and unloading step during storage or transportation of the blocks to a point of use.

Second, to provide a hand truck adapted to hold and carry a load of concrete building blocks without the use of a separate pallet or platform for the blocks.

Third, to provide a hand truck with a hook arranged to engage the load on the truck and form a lifting connection for both the load and the truck in one position of the hook and to be swung into position to act as a rest for the truck in horizontal loading position of the truck.

Fourth, to provide load engaging members for a hand truck which operate to clamp a load on the truck and act as lifting elements for the load and the truck.

Fifth, to provide a hand truck for blocks and the like which may be easily loaded in a convenient horizontal position and moved to a vertical position for being lifted with its load to a different level.

Sixth, to provide a hand truck of the type described which is inexpensive and light for economically transporting concrete blocks or other loads.

Other objects and advantages pertaining to the details and economies of my truck will be apparent from a consideration of the following description and the accompanying drawings. The invention is further pointed out in the claims.

The drawings, of which there is one sheet, illustrate a preferred form of my hand truck.

Fig. 1 is a side elevational view of my hand truck, the full lines showing the truck in vertical position and arranged to be hoisted with a load of concrete blocks thereon, portions of the blocks and the lifting fork of the truck being illustrated in cross section, the dotted lines showing the truck in a horizontal loading and intermediate rolling position.

Fig. 2 is a front elevational view of my truck in vertical position, a load of concrete blocks therefore being indicated in dotted lines.

Fig. 3 is a fragmentary plan view of my truck in vertical loaded position, portions of the load being broken away to illustrate the position of the fork of the truck.

My truck in the embodiment illustrated comprises a tubular framework having generally parallel side frame members 1 which are inwardly offset adjacent the lower end 2 thereof and connected by a cross plate 3. The ends of the cross plate are bent forwardly of the framework to form load engaging forks or nose pieces 4. Axle supporting strut or brace bars 5 are connected to the lower ends of the side frame members 1 by forwardly projecting arms and extend in inwardly converging relation to a cross bar 6 connected between the upper ends of the side members 1. An axle 7 is secured to the lower ends of the bars 5 and is provided with a pair of pneumatic wheels 8. The upper ends of the side members 1 are bent rearwardly and outwardly to form handle portions 9 provided with the grips 10. Braces 21 extend from the inwardly offset portions of the side bars to strut bars 5 in opposed relation to the axle.

Pivotally secured to the cross bar 6 is a U-shaped arm 11 which is of such dimension as to overhang the front of a stack of concrete blocks 12 supported on the forks 4. A grip or work clamp member 13 is pivotally mounted between the sides of the U-shaped arm 11 by the pin 14. The lower or front end of the grip member 13 is provided with the angle shaped block engaging shoe 15 adapted to engage the upper outer edge of the uppermost block in the stack on the truck and engageable with the underside of the arm 11 to limit the rotation of the clamp 13 towards disengaged position.

The arm 11 is arranged to be rotated to the rear of the truck so that the base of the arm acts as a support for the upper end of the truck when the truck is disposed in horizontal position as indicated by the dotted lines at 16 in Fig. 1. A stop rod 17 secured between the bars 5 serves to limit the rearward rotation of the arm 11. The rear end of the clamp member 13 is provided with a ring 18 arranged to be engaged by a hook 19 for lifting the hand truck with a load of blocks thereon.

It is believed the drawing illustrates clearly the advantages realized by the use of my truck. In the horizontal position of the truck the arm 11 acts as a rest supporting the truck in a horizontal position. Objects such as cement blocks can be easily loaded with a low lift to the frame of the truck. The bottom block may be placed with its cored openings 20 receiving the forks of the truck and when the truck is tipped to vertical position this bottom block will act as a pallet to support the stack. The truck may be wheeled to any desired position in the usual manner and when tipped to vertical position and the arm 11 swung to load engaging position as previously described and the truck and its load may be hoisted to a different level. The upward lifting force of the hook 19 on the ring 18 and clamp 13 acts to swing the clamp member 13 into tight gripping relationship with the upper block of the load so that there is no danger of the blocks falling off of the truck. It will be noted that the pivot pin 14 is positioned forwardly of the center line of the block 12 thereby locating the ring 18 approximately over the center of gravity of the load and truck eliminating any tendency of the truck and load to tilt while being lifted.

The truck frame structure is formed mainly of tubular stock pipes being satisfactory. The parts are so designed and arranged that the stresses of a load are well disposed throughout the frame so that the frame may be made of comparatively light stock and is not likely to be distorted even under heavy loads. This light structure is advantageous in the matter of handling the truck.

It will be observed that the wheels of the truck are disposed so that when a loaded truck is in upright position the wheels coact with the load such as a stack of blocks in supporting the load in upright position, shown in full lines in Fig. 1. Where the load is placed on the truck with the truck in horizontal position, as indicated by dotted lines in Fig. 1, the hoisting tackle is preferably engaged before the tongue is swung to completely upright position, if desired the truck may be loaded in upright position but that necessitates more lifting.

My truck is useful for transporting newly formed blocks to storage areas and may be used to lift a stack of blocks to the top of a storage pile. The truck is also useful for delivering a stack of blocks from a delivery truck to a point of use in a building under construction. The truck materially reduces the amount of labor required to handle concrete blocks and the like by eliminating individual handling of the blocks in moving them from one level to another. While concrete blocks are illustrated as the load for the truck, other objects such as bricks, boxes or cartons would obviously be handled with equal facility on the truck.

I have illustrated and described a highly practical commercial embodiment of my hand truck so that others may reproduce and use the same without further description.

Having thus described my invention, what I claim as new and desire to secure by Letters Patent is:

1. A hand truck for moving cored concrete blocks comprising a framework having side frame members adapted to support a load of blocks in the horizontal position of said trucks, handle portions turned rearwardly and outwardly from the upper ends of said side frame members, a plate connecting the lower ends of said side frame members and having fork portions turned forwardly from the ends thereof and adapted to support a load of concrete blocks in the vertical position of the truck by engagement in the cored recesses of the bottom block of a load, strut and brace bars having forwardly projecting lower ends secured to said frame side members secured to said frame side members, and extending upwardly in converging relation, an axle having wheels thereon secured to the lower portions of said strut bars, a cross bar connecting the upper ends of said side members and strut bars, an arm of U-shaped cross section having its ends pivotally mounted on said cross bar and adapted to be swung between a forward position to overhang a load of blocks on said truck and a rearward position to form a rest for the upper end of said truck, a stop for said arm extending between said strut bars, a clamp member pivotally mounted between the sides of said arm and forwardly of the center of a load of blocks supported on said forks, said clamping member having an angle shaped block engaging member secured to the forward end thereof, and a lifting ring secured to the rear end of said clamping member and positioned approximately over the center of gravity of a load of blocks on said truck when said truck and clamping member are in lifting position.

2. A hand truck for moving cored concrete blocks comprising a framework having side frame members adapted to support a load of blocks in the horizontal position of said truck, handle portions on the upper ends of said side frame members, a plate connecting the lower ends of said side frame members and having fork portions turned forwardly from the ends thereof and adapted to support a load of concrete blocks in the vertical position of the truck, strut and brace bars having forwardly projecting lower ends secured to said frame side members, and extending upwardly in converging relation, an axle having wheels thereon secured to the lower portions of said strut bars, a cross bar connecting the upper ends of said side members and strut bars, an arm having its end pivotally mounted on said cross bar and adapted to be swung between a forward position to overhang a load of blocks on said truck and a rearward position to form a rest for the upper end of said truck, a clamp member pivotally mounted on said arm and forwardly of the center of a load of blocks supported on said forks, said clamping member having block engaging member secured to the forward end thereof, and a lifting member secured to the rear end of said clamping member and positioned approximately over the center of gravity of a load of blocks on said truck when said truck and clamping member are in lifting position.

3. A hand truck for transporting concrete blocks and the like comprising, a framework having side frame members, a first cross member connected between the upper ends of said side frame members, load engaging forks projecting from the lower ends of said side frame members, an arm pivotally mounted on said first cross member and adapted to overhang the top of a stack of blocks on said truck, a clamping member pivotally secured to said arm and having a block engaging shoe opening to the rear of said truck on the lower end of said clamping member, a lifting ring carried by the rear end of said clamping member, and a second cross member on said framework adapted to engage said arm when said arm is rotated rearwardly to locate said arm to form a rest for the upper end of said truck when said truck is disposed horizontally.

4. A hand truck for transporting concrete blocks and the like comprising, a framework having side frame members, a first cross member connected between the upper ends of said side frame members, load engaging forks projecting from the lower ends of said side frame members, an arm pivotally mounted on said first cross member and adapted to overlie the top of a stack of blocks on said truck, a clamping member pivotally secured to said arm and having a block engaging shoe opening to the rear of said truck on the lower end of said clamping member, a lifting member carried by the rear end of said clamping member, and a stop member on said framework adapted to engage said arm when said arm is rotated rearwardly to locate said arm to form a rest for the upper end of said truck when said truck is disposed horizontally.

5. A hand truck comprising, a framework having side frame members, load engaging forks projecting from the lower ends of said side frame members, an arm pivotally mounted on said framework and adapted to overlie the top of a load on said truck and to be swung to the rear to act as a rest for said truck, and a clamping member pivotally secured to said arm and having a load engaging shoe opening to the rear of said truck on the lower end of said clamping member, said clamping member being adapted to engage a lifting means at the rear end of said clamping member.

6. A hand truck comprising, a framework, an arm pivotally mounted on said framework and adapted to overlie the top of a load on said truck and to be swung to the rear to act as a rest for said truck, and a clamping member pivotally secured to said arm and having a load engaging shoe opening to the rear of said truck on the lower end of said clamping member, said clamping member being adapted to engage a lifting means at the rear end of said clamping member.

7. In combination with a hand truck for moving concrete blocks, an arm of U-shaped cross section having its ends pivotally mounted on said truck and adapted to be swung between a forward position to overhang a load of blocks on said truck and a rearward position to form a rest for the upper end of said truck, a clamp member pivotally mounted between the sides of said arm and forwardly of the center of a load of blocks supported on said truck, said clamping member having an angle shaped block engaging member secured to the forward end thereof, and a lifting ring secured to the rear end of said clamping member and positioned approximately over the center of gravity of a load of blocks on said truck when said truck and clamping member are in lifting position.

8. In combination with a hand truck, an arm having its end pivotally mounted on said truck and adapted to be swung between a forward position to overlie a load on said truck and a rearward position to form a rest for the upper end of said truck, and a clamp member pivotally mounted on said arm and forwardly of the center of the load on said truck, said clamping member having a load engaging member secured to the forward end thereof and being adapted to engage a lifting member approximately over the center of gravity of the load on said truck when said truck and clamping member are in lifting position.

9. A hand truck comprising, frame and carrying wheels, forwardly projecting load supporting arms at the lower end of said frame adapted to engage openings in the lower of a stack of blocks having openings therein, the wheels being positioned relative to the nose piece so that they coact with the stack of blocks in supporting the truck with its load in an upright position, and a hoisting tackle mounted on the upper end of the frame and comprising a load clamping member adapted to retainingly clamp the upper block of a stack when lifting stress is applied to the tackle.

10. A hand truck comprising, frame and carrying wheels, a load supporting nose at the lower end of said frame, and a hoisting tackle mounted on the upper end of the frame and comprising a load clamping member adapted to retainingly clamp the upper block of a stack when lifting stress is applied to the tackle.

11. In a hand truck, the combination of a frame comprising, side frame members having rearwardly offset upper ends providing handles and inward offsets adjacent their lower ends, a cross bar extending between said side members at their upper ends, strut members having forwardly projecting arms at their lower ends secured to the lower ends of the side member, said struts being arranged in downwardly diverging relation with their upper ends secured to said cross bar adjacent the center thereof, an axle secured to said strut members adjacent their lower ends and provided with wheels, and a nose piece secured to the lower ends of said side members and constituting a cross member therefore, said nose piece being provided with forwardly projecting work supporting arms adapted for engagement with a load.

12. In a hand truck, the combination of a frame comprising, side frame members having rearwardly offset upper ends providing handles and inward offsets adjacent their lower ends, a cross bar extending between said side members at their upper ends, strut members having forwardly projecting arms at their lower ends secured to the lower ends of the side member, said struts being arranged in downwardly diverging relation with their upper ends secured to said cross bar adjacent the center thereof, an axle secured to said strut members adjacent their lower ends and provided with wheels, and a nose piece secured to the lower ends of said side members.

13. In a hand truck, the combination of a frame comprising, side frame members having rearwardly offset upper ends providing handles and inward offsets adjacent their lower ends, a cross bar extending between said side members at their upper ends, strut members having forwardly projecting arms at their lower ends secured to the lower ends of the side member, said struts being arranged in downwardly diverging relation with their upper ends secured to said cross bar adjacent the center thereof, an axle secured to said strut members adjacent their lower ends and provided with wheels, braces extending from the inwardly offset portions of said side members to said strut members adjacent the axle.

ROBERT S. REED.

REFERENCES CITED

The following references are of record in the file of this patent:

UNITED STATES PATENTS

| Number | Name | Date |
|---|---|---|
| 894,452 | Medairy | July 28, 1908 |
| 1,469,200 | Wallace | Sept. 25, 1923 |
| 1,626,644 | Stover | May 3, 1927 |
| 1,824,786 | Nakkerud | Sept. 29, 1931 |
| 1,971,952 | Townsend | Aug. 28, 1934 |